United States Patent Office 3,454,493
Patented July 8, 1969

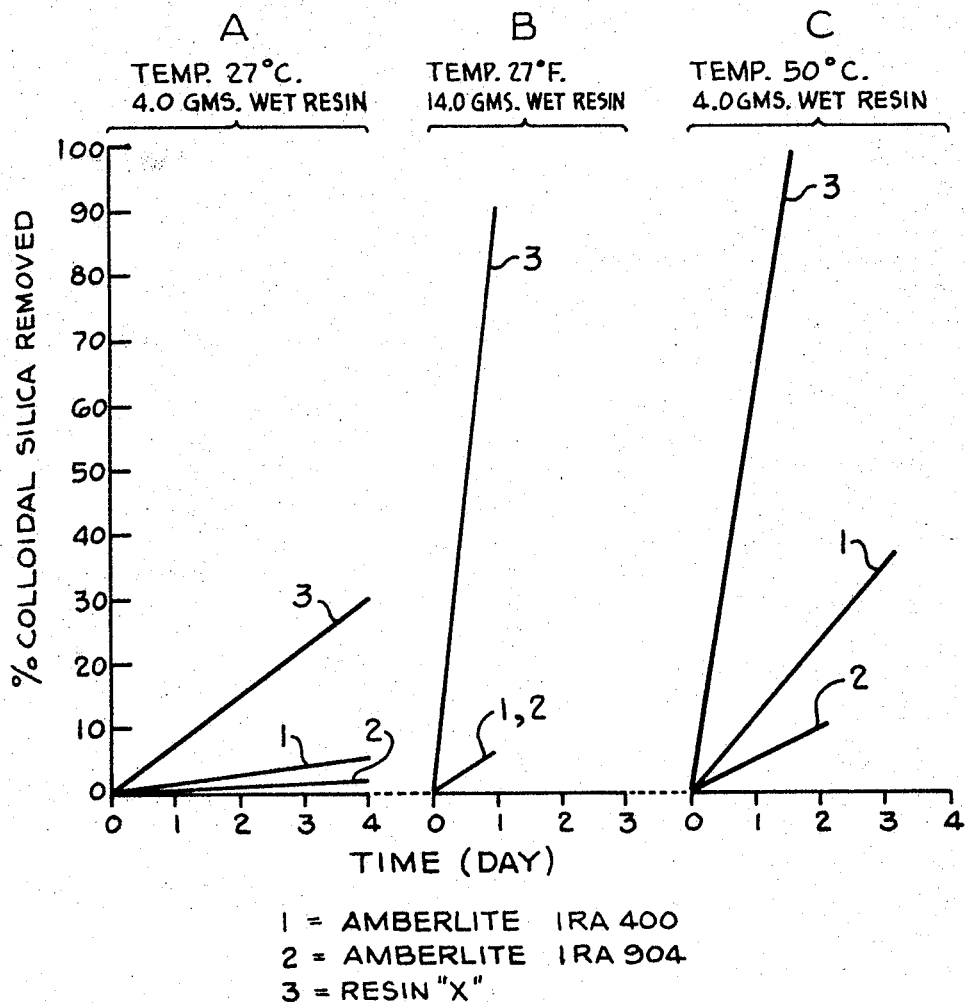

3,454,493
PROCESS AND PRODUCT FOR REMOVING COLLOIDAL MATERIALS FROM AQUEOUS MEDIA
Kenneth A. Kun, Riverton, N.J., and Robert Kunin, Yardley, Pa., assignors to Rohm & Haas Company, Philadelphia, Pa., a corporation of Delaware
Filed Aug. 1, 1966, Ser. No. 569,290
Int. Cl. C02b 1/60
U.S. Cl. 210—37     13 Claims This invention relates to the chemical treatment of aqueous solutions, and in particular to the treatment of any waters, including deionized waters, to remove particulate matter such as colloidal silica and hydrous metal oxides.

The removal of silica from boiler feed waters has become an important problem in recent years with the trend for higher pressure boilers. A detailed explanation of the need for such removal is set forth in U.S. Patent 2,504,695. That patent clearly points to the fact that ion exchange methods have been known for the removal of soluble or non-colloidal silica. The materials which have made removal by such methods possible are the strongly basic anion exchange resins, generally of the quaternary ammonium type, either of the conventional gel structure disclosed in U.S. Patent 2,591,573, or of the conventional macroreticular structure disclosed in U.S. Patent 3,037,052.

Since the operation of a high pressure boiler depends upon the total quantity of silica accumulating therein, the previously known methods for removing only non-colloidal silica have not been enough to satisfactorily solve the problem. In fact, the inability of ion exchange resin systems to remove colloidal silica has been a severe drawback to the use of ion exchange methods in the deionization of waters for various applications. In addition to boilers, for example, the electronics industry and the various industries dependent upon applications of nuclear energy have long had need for the removal of particulate matter from the waters which they are obliged to employ, and this need has not been satisfied by previously known silica removal or deionization techniques. Although shallow filter beds of finely powdered ion exchange resins have been used to remove colloidal silica and iron from deionized effluents, their use leaves much to be desired because of their limited effectiveness and their inability to be regenerated.

The present invention makes possible the desired removal of colloidal particulate matter, such as silica and the like, by providing a novel resin and process which successfully remove such colloidal materials that heretofore have been incapable of being extracted or eliminated by prior art materials and methods. The materials of the present invention are anion exchange resins which have a macroreticular structure. They are uniquely characterized by having average pore diameters which range in size between 10,000 and 500,000 Angstroms. This is to be compared with prior art macroreticular structure resins, such as those described in U.S. Patent 3,037,052, whose average pore diameters have ranged from 30 to 800 Angstroms. A further comparison may be made with the even earlier, conventional gel type resins, such as those described in U.S. Patent 2,591,573, which have no macroreticular or macroporous structure.

When one attempts to remove colloidal particulate matter by conventional methods, as by using a succession of filters and/or coagulants, only very small portions of these particles are removed. Customarily, carbon filters may be employed for this purpose and this often is followed by use of a mixture of anion and cation exchange resins which will deionize or demineralize the water. The effluent from such a series of treatments will generally be devoid of all the ions which one seeks to remove in order to make the water useful in boilers and other such applications, except for silica, metal oxides or other colloidal particulate matter. Now, by virtue of the present invention, such colloidal particulate matter is readily removed from the water by the new macroreticular resins, and the resins can readily be regenerated so as to remove the particulate matter collected thereon and thereby enable the novel resins to be used over and over again in commercially acceptable cyclical processes.

A comparison of the colloidal particulate matter-removal ability of the resin of the present invention, and that of the conventional gel and macroreticular type resins of the prior art, can be seen by reference to the figure. The graphs in that drawing compare the rates of colloidal silica removal using various strong base quaternary ammonium anion exchange resins. In that comparison different weights of wet resin, at different temperatures, were employed in three separate experiments identified in the drawing as A, B and C, respectively. In each case the resins were used to remove colloidal silica which was present in a concentration of 1,000 p.p.m. (parts per million) in a dispersion of 200 ml. of water. The percent of colloidal silica removed was measured on each of four consecutive days.

The resins used in the experiments recorded in the figure were as follows: (1) A conventional gel type quaternary ammonium anion exchange resin which is commercially known as Amberlite IRA–400, and which is of the structure generally disclosed in U.S. Patent 2,591,573. (2) A similar quaternary ammonium anion exchange resin which is commercially known as Amberlite IRA–904, the sole difference in nature between the first two resins being that the former is a non-porous gel type, styrene-divinylbenzene resin, whereas the latter is a macroporous or macroreticular styrene-divinylbenzene resin having the structure which is described in the aforementioned U.S. Patent 3,037,052. (3) Resin X, the highly porous macroreticular resin of the present invention.

A comparison of the physical structures of these three resins is set forth in Table 1 below. As reference to that table will indicate, the gel resin, Amberlite IRA–400, has no pores and therefore no pore diameters which can be measured. The prior art macroreticular resin, Amberlite IRA–904, will be seen to have a range of pore diameters from below 300 to a maximum of 1,900. The third material, Resin X, is also macroreticular in structure but the range of its pore diameters averages from 10,000 to at least 100,000. The remaining data in Table 1 indicate differences in the density and total porosity of each of the three resins, these data being supplied merely for informational purposes in comparing the nature of the three materials. It should be understood that the major differences which are of interest for consideration and understanding of the present invention, and its advance over the prior art, are the data concerning the range of pore diameters of the resins.

TABLE 1.—PORE STRUCTURE CHARACTERISTICS OF SOME RESINS USED FOR COLLOIDAL SILICA REMOVAL

| Resin | Mean pore diameter (A) | Range of pore diameters | Density (g./cc.) | | Total porosity | | | Surface area, sq. m./g [5] |
| --- | --- | --- | --- | --- | --- | --- | --- | --- |
| | | | Apparent $(\rho_a)$[1] | Skeletal $(\rho_s)$[2] | Densitometer | | Penetrometer, cc./g.[4] | |
| | | | | | Cc./cc.[3] | Cc./g.[4] | | |
| Amberlite IRA-400 | None | None | 1.13 | 1.13 | None | None | None | <0.1 |
| Amberlite IRA-904 | 690 | 258–1,900 | 0.55 | 1.114 | 0.502 | 0.906 | 0.88 | 42.2 |
| Resin X (resin of present invention) | 46,000 | 10,000–100,000 | 0.583 | 1.147 | 0.603 | 1.035 | 1.0 | 8.9 |

[1] Apparent density (i.e. density of bead, taking into account the volume of the bead without regard for the holes in it, and dividing the volume by the weight).
[2] Skeletal density (or true density, which is the density of the beads themselves, as if they were solid and had no voids or pores at all).
[3] Volume of pores/volume of resin.
[4] Volume of pores/g. of resin.
[5] Square meters/g. of resin.

Referring once again to the figure, it will be seen that the ability of the three resins just discussed to remove colloidal silica varies tremendously. In graph A, the resin of the present invention removed 30% of the colloidal silica in 4 days, whereas the gel type and prior art macroreticular type resins removed only about 5% colloidal silica. Similarly, under the conditions reflected in graph B, the resin of the present invention removed 90% of the silica in a single day, whereas in the same period of time the other two resins removed only about 5%. Likewise, in graph C, the resin of the present invention will be seen to have removed almost 100% of the colloidal silica in less than 2 days, whereas the other two resins were able to remove less than 40% in a period of 2 to 3 days.

The resins discussed in the figure and in Table 1 were all in the OH form. However, it should be understood that the resin of the present invention can remove colloidal particulate matter in either the OH or the salt form, being readily regenerated with sodium hydroxide or hydrochloric acid.

The original experiments which established the efficacy of the present invention were carried out in the laboratory under relatively ideal conditions. For example, in testing the removal of colloidal silica the water used was specially prepared, and it contained pure colloidal silicic acid. However, it was recognized that the content of colloidal particulate matter in natural waters existing in different parts of the country, or in fact throughout the world, would establish different conditions which would have to be dealt with. Accordingly, tests were made of water taken from a number of different localities throughout the United States to determine how well the present invention would function under such different conditions.

A principal test was carried on for some time at the Ravenswood Station of the Consolidated Edison Company in New York City. Interesting information was obtained there with regard to the regeneration of the ion exchange resin of the present invention in connection with these experiments. It was found that the natural silicas and metal oxides are loaded as silica-metal oxide complexes or clay fragments which are normally quite resistant to removal by even hot caustic. The colloidal metal oxides are practically not affected at all by caustic. Both the silicates and the colloidal metal oxides are, however, solubilized with hot hydrochloric acid. Even more effective is the use of both the hot caustic and the hot acid, with the preferred method being to use the acid first. To illustrate this regeneration effectiveness, the novel resin was permitted to become exhausted by virtue of having taken on a full load of colloidal silica from the water at the Consolidated Edison Co.'s New York City location, and then regenerated with the results shown in Table 2 below. As will be noted, the hot acid regenerations removed 100% of the silicates and better than 90% of the colloidal iron oxides, while the caustic regeneration removed a small part of the iron oxide and between 60 and 80% of the silica.

TABLE 2.—REGENERATION OF LOADED RESIN OF PRESENT INVENTION (RESIN X)

| | | Mg./g. dry resin, percent removed | |
| --- | --- | --- | --- |
| | Before regeneration, loaded resin | After regeneration | |
| Top fraction | | Hot NaOH (aq.) | Hot HCl (aq.) |
| A | Residue, 19.60 | 12.34 (37) | 0.50 (97.5) |
| | $SiO_2$, 10.94 | 3.29 (66.7) | 0.00 (100) |
| | $Fe_2O_3$, 6.02 | 5.65 (6) | 0.54 (91) |
| B | Residue, 5.18 | 4.51 (13) | 0.07 (98.6) |
| | $SiO_2$, 1.17 | 0.16 (86.4) | 0.00 (100) |
| | $Fe_2O_3$, 2.97 | 3.29 | 0.00 (100) |

As pointed out above, the nature of colloidal silica may vary from one geographical area to another. Accordingly, in order to further test the ability of the resin of the present invention to remove colloidal silica when the resin is regenerated, samples of surface water were obtained from various water supplies throughout the eastern portion of the United States and analyzed for colloidal silica and iron by means of the well-known Millipore filter technique. Those waters containing significant amounts (0.01 p.p.m.) of colloidal silica were then deionized with Amberlite MB-1 (a mixed bed of anion and cation exchange resins) and then treated with the regenerated resin of the present invention. The results of these studies are summarized in Table 3 below. The data in that table indicate quite clearly that colloidal silica was present in most of those surface waters, and TABLE 3.—EFFECTIVENESS OF REGENERATED RESIN OF THE PRESENT INVENTION (RESIN X) FOR REMOVING COLLOIDAL SILICA AND IRON FROM WATER IN THE EASTERN UNITED STATES

| Water source | Influent (p.p.m.) | | Effluent (p.p.m.) | | Percent removal | |
| --- | --- | --- | --- | --- | --- | --- |
| | $SiO_2$ | Fe | $SiO_2$ | Fe | $SiO_2$ | Fe |
| Wabash River, Public Service Co., Terre Haute, Ind. | 0.0001 | 7.1 | 0.00008 | 0.085 | 20.0 | 98.8 |
| James River, Owen Illinois, Big Island, Va. | 0.000049 | 1.7 | 0.000043 | 0.050 | 12.2 | 97.1 |
| Savannah River, Continental Can Co., Augusta, Ga. | 0.20 | 2.1 | 0.00012 | 0.045 | 99.9 | 97.9 |
| Ohio River (42.1 miles above Cano, Ill.), Lock Dam 52, Brookport, Ill. | 0.43 | 1.8 | 0.095 | 0.015 | 78.0 | 99.2 |
| Mississippi River, Arkansas Power & Light Co., Robt. E. Ritchie Station, Helena, Ark. | 0.39 | 0.8 | 0.053 | 0.042 | 86.4 | 94.7 |
| Tennessee River, T.V.A.—Cobert Plant, Tuscumba, Ala. | 0.031 | 2.7 | 0.000076 | 0.050 | 99.7 | 98.1 |
| Tennessee River, Pennsalt Chemical Co., Calvet City, Ky. | 0.018 | 1.7 | 0.000076 | 0.0025 | 99.6 | 99.9 |
| Peedee River, International Paper Co., Georgetown, S.C. | 0.98 | 4.2 | 0.16 | 0.041 | 83.7 | 99.0 | in each case was combined with colloidal iron. Likewise, it is also apparent that the regenerated resin of the present invention is effective to remove the colloidal silica and iron present in each of those waters even though the $Fe_2O_3/SiO_2$ ratio varied considerably. It is also quite noteworthy that the influent to Resin X left an appreciable deposit when passed through a membrane filter but after passage through Resin X the effluent left practically no residue on such a filter, indicating that Resin X is as effective as membrane filters for the removal of these colloids.

The colloid-removing anion exchange resin described above can be used by itself in either the hydroxide or the salt form (chloride, sulfate, nitrate, etc). for removing colloids or particulate matter such as colloidal silica or hydrous oxides. The exchanger may be employed as a bed or column, or it may be employed batch-wise by intimaetly contacting the resin with a colloid-containing system. In addition, the anion exchange resins described above can be used in conjunction with cation exchange resins so as to simultaneously achieve deionization and colloid removal. One may accomplish this by passage of the colloid system through a column of the hydrogen form of a sulfonic acid cation resin and then through a column of colloid-removing anion exchange resin in the hydroxide or free base form, or by first passing the system through the hydroxide form of the anion exchange resin and then through the hydrogen form of any cation exchange resin. One may also simultaneously deionize and remove the colloids from the system by contacting the system, either in a column or batch-wise, with a mixture of the basic form of the anion exchange resin and the hydrogen form of the cation exchange resin.

To demonstrate the ability of Resin X to function simultaneously as an anion exchange resin and as a colloid-removing resin, 80 ml. of this resin (which was regenerated with 100 ml. of 1 N NaOH) was mixed with 20 ml. of Amberlite IR-120, a sulfonic acid cation exchange resin (which was regenerated with 30 ml. of 1 HCl), and the mixture placed in a 1″ diameter column. Two liters of a natural water supply containing 100 p.p.m. of dissolved electrolyte and 0.05 p.p.m. each of colloidal $SiO_2$ and $Fe_2O_3$ were passed through the mixture and the effluent analyzed for conductivity, colloidal $SiO_2$ and $Fe_2O_3$. The analysis showed that 95% of the colloidal $SiO_2$ and $Fe_2O_3$ was removed and that the dissolved electrolyte was reduced to less than 1 p.p.m.

Because of the macroreticular nature of Resin X and analogues of it, one may also employ the resins in systems other than water. For example, they may be employed to remove particulate matter from solvents. A small column of the dry, hydroxide form of Resin X was found to remove a trace of colloidal iron oxide present in a sample of ethanol which had become contaminated.

General preparation of resins of present invention

The unique macroreticular resins of the present invention may be prepared by methods which are somewhat analogus to the method disclosed in U.S. Patent 3,037,052 for preparing prior art types of macroreticular resins. The novel macroreticular structure is achieved by copolymerizing monoethylenically unsaturated monomers with polyvinylidene monomers in the presence of certain compounds. Characteristic of these compounds is the fact that each is a solvent for the monomer mixture being copolymerized and yet each exerts essentially no solvent action on said copolymer. For ease of reference hereinafter such a compound will be termed "precipitant."

It is necessary that the precipitants form a homogenous solution with the monomer. Further requirements are that the precipitants must be incapable of exerting solvent action on or being imbibed by the copolymer to any appreciable extent, or the aforesaid unique properties will not be obtained in the copolymers produced. An additional requirement is that the precipitants must be chemically inert under the polymerization conditions, that is to say they must not react chemically with any of the reactants or with the suspending medium if one be used. A preferred class of precipitants are those which are liquid under the polymerization conditions.

The determination of the most effective precipitants and the amounts required for the formation of a particular copolymer with a macroreticular structure may vary from case to case because of the numerous factors involved. However, although there is no "universal" or single class of precipitants applicable to all cases, it is not too difficult to determine which precipitants will be effective in a given situation. The requirements of solubility with the monomer mixture and low or non-solubility in the copolymer can be tested empirically, and the solubilities of many monomers and copolymers are well-known from publications and textbooks.

Cross-linked copolymers are generally insoluble, but they will absorb or imbibe liquids which might be considered as being good "solvents." By immersing the cross-linked copolymer in liquids and determining the degree of swelling, a suitable precipitant can be chosen. Any of the liquids which are solvents for the monomer mixture, which give negligible swelling of the copolymer, which are chemically inert under polymerization conditions, and which are substantially insoluble in the suspending medium, if one be used, will function as precipitants.

As a further guide in the selection of a suitable precipitant, reference may be made to the scientific literature, for instance as discussed in Hildebrand and Scott, "Solubility of Non-Electrolytes" (3d ed., New York, 1950). In general, it may be stated that sufficiently wide differences in the solubility parameters of polymer and solvent respectively, must exist for the precipitant to be effective. Moreover, once an effective precipitant has been identified, the behavior of many other liquids may be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect "phase separation," a phenomenon which will be explained below. This is comparable to the observation that many liquid systems containing two or more components are homogeneous when some components are present in only minor amounts; but if the critical concentration is exceeded, separation into more than one liquid phase will occur. The minimum concentration of the precipitant in the polymerizing mixture will have to be in excess of the critical concentration. The amounts in excess of such critical concentration can be varied, and they will influence to some extent the properties of the product so formed.

Introduction of the precipitant leads to two effects, the second effect undoubtedly depending on the first. By adding the precipitant to the monomer phase, the solubility in the monomer phase of any copolymer formed is decreased and the copolymer separates from the monomer phase as it is formed. This phenomenon is the one referred to above as "phase separation." As the concentration of monomer in the polymerizing mass decreases due to polymerization, and as the concentration of resulting copolymer increases, the precipitant is more strongly repelled by the copolymer mass and is actually squeezed out of the copolymer phase leaving a series of microscopic channels.

These microscopic channels are separate and distinct from the micropores which are present in all cross-linked copolymers as is well-known to those skilled in the art (cf. Kunin, "Ion Exchange Resins," page 45 et seq., John Wiley & Sons, Inc., 1958). While said channels are relatively small in the commonly thought of sense, they are large when compared with the micropores of the prior art gel type resins hereinbefore referred to. Thus, the use of a precipitant results in the formation of an unusual and desirable macroreticular structure.

Precipitants suitable for the styrene-divinylbenzene copolymers which are preferred as intermediates for the resins of the present invention include alkanols with a carbon content of from 4 to 10, such as n-butanol, sec-butanol, tert-amyl alcohol, n-hexanol and decanol. Higher saturated aliphatic hydrocarbons, such as heptane, isooctane and the like can also function as precipitants in these systems.

Preparation of Resin X used to remove colloidal silica in Tables 1, 2 and 3

The foregoing general method of preparation was followed in the preparation of the resin of the present invention which was actually employed in the experiments that established the exceptional ability of that resin to remove colloidal particulate matter. Following is the specific procedure employed to make that resin which, incidentally, has herein been identified as Resin X in order more simply to distinguish it from the prior art resins with which it was compared.

Since the resin to be employed was for the removal of colloidal silica and other such colloidal particulate matter, a strong base anion exchange resin was preferred. This was prepared with trimethyl amine quaternary functionality. The polymer which was converted to the ion exchange resin was made with a charge whose aqueous phase consisted of 900 ml. of city water, 9.0 g. of Amberlite W-1 (20% solids), and 0.09 g. of Pharmagel. The monomer phase was made with 301.3 g. of styrene, 16.7 g. of divinylbenzene (57.1%), 282.0 g. of tert-amyl alcohol and 6.0 g. of azo-bis-isobutyronitrile.

The charge was placed in a 2-liter glass resin pot, equipped with a stainless steel stirrer, a reflux condenser, an addition funnel and a thermoregulated heating mantle. The water, Amberlite W-1 and Pharmagel were dissolved by warming to 40–45° C. and the solution was kept under agitation. The styrene-divinylbenzene, tert-amyl alcohol, and azo-bis-isobutyronitrile were mixed together and, when dissolved, the mixture was charged to the resin flask also. The batch was heated to 70° C. and held for 20 hours. The polymer which results was washed several times with water to remove the Amberlite W-1, and the tert-amyl alcohol removed by steam distillation, which normally takes about 5 hours. The batch then was cooled to about 35–40° C., and again washed with water. The polymer, which was in the form of resinous beads, was drained on a suction filter and dried to constant weight in a steam oven at a temperature of approximately 70° C., the drying process taking about 20 hours. The dry beads were then screened between 20–70 mesh screens to remove fine and coarse particles.

The beads thus obtained were the intermediate product which must be chloromethylated and aminated in order to form the ion exchange resin. For this purpose the charges consisted of 212 g. (2.0 moles) of the intermediate beads whose preparation has just been described, 484 g. (6.0 moles) of chloromethyl ether, 1200 ml. (1500 g.) ethylenedichloride, 160 g. (1.2 moles) of $AlCl_3$, 800 ml. of a quench solution made up of 6.5% $NaH_2PO_4$ and 5.5% $H_2SO_4$ in water, 20 g. of $NaHCO_3$, and 500 ml. of 25% trimethyl amine (2.0 moles).

The resin beads, chloromethyl ether and ethylenedichloride were charged to a 5-liter flask equipped with a glass stirrer, a thermometer and a reflux condenser topped with a $CaCl_2$ drying tube. The batch was stirred for ½ hour to swell the beads. The $AlCl_3$ was added in a number of small portions at 20 minute intervals, keeping the temperature between 30–40° C., and stirring the batch for 4 hours. The chloromethyl ether and ethylenedichloride were distilled off until the flask temperature reached 80° C., and about half the quench solution added in a fine stream through a dropping funnel with stirring and external cooling to keep the batch temperature below 30° C. After stirring the batch for 20 minutes the entire liquid phase was drawn off with a stick filter. The balance of the quench solution was added and the batch stirred for 20 minutes, the liquid being drawn off as before. The resin was washed several times with water, stirred for 15 minutes and the liquid again drained off with a stick filter. A neutralizing solution containing about 20 g. of $NaHCO_3$ dissolved in 800 ml. of water was added, the batch being stirred for ½ hour and the neutralizer drained off. The resin was again washed with water.

At this point the amination was accomplished by adding the aqueous trimethyl amine in a fine stream through a dropping funnel, keeping the batch at between 20 and 25° C., and stirring it for about 4 hours. Any remaining ethylenedichloride was stripped off by steam distillation and water added to keep the slurry fluid.

The foregoing procedure, which of course is merely illustrative of the method of preparation of the resin, provided a wet yield of approximately 1400 g., with a solids content of approximately 27% and a dry yield of about 5%. The moisture holding capacity of the resin ranged between 70 and 74%; the anion exchange capacity had a minimum of 3.7 meq./g. The porosity of the resin ranged between 0.9–1.0 cc./g., the pore size range extended from 30,000 to 200,000 Angstroms, and the surface area ranged between 5 and 20 sq m./g.

Though resins with strong base functionality are preferred for the removal of colloidal silica and other such colloidal particulate matter, weak base anion exchange resins having the same unique macroreticular structure will also perform the desired operation. Such weak base anion exchange resins were prepared in exactly the same manner as the strong base resins whose preparation was described above, with the exception that the trimethyl amine was replaced with dimethyl amine, diethyl amine, monomethyl amine, ethanol amines, etc. These weak base anion exchange resins, apart from the differences in ion exchange functional groups, were exactly the same in structure as the strong base anion exchange resins, particularly with regard to their macroreticularity and average pore sizes.

Other means of making the unique macroreticular structure possessed by the resins of the present invention may of course be devised, either by changing some of the reactants used in the process or by changing the reacting conditions. For the purposes of the present invention, it does not matter in what manner the novel macroreticular structured resins are produced, provided that a substantial number of pores in each resin bead had diameters ranging between 10,000 and 500,000 Angstroms. (Resins having pore diameters avaraging about 500,000 Angstroms are obtainable by varying the procedures set forth above for preparing Resin X, one such variation consisting of increasing the polymerization temperature to 80–85° C. Such resins remove colloidal particulate matter very satisfactorily in accordance with the present invention.) Such resins will, in accordance with the description set forth above, effectively remove colloidal silica, metal oxides, and other colloidal anionic species, including humic acid and viruses. These resins, as has been demonstrated, can readily be regenerated with an acid and/or acid-alkali regeneration technique. Accordingly, they can very efficiently and effectively be utilized in many commercial applications.

We claim:

1. The method of removing particulate matter from an aqueous medium, including colloidal silica and hydrous metal oxides, which comprises intimately contacting the aqueous medium with anion exchange resins having a macroreticular structure and further having average pore diameters which are within the range of from about 10,000 to about 500,000 Angstroms.

2. The method of claim 1 in which the average pore diameters of the resins are within the range of from about 10,000 to about 100,000 Angstroms.

3. The method of claim 1 in which the resins are in the basic form.

4. The method of claim 1 in which the resins are in the salt form.

5. The method of claim 1 in which the aqueous medium being treated is one which has previously been treated so as to be essentially deionized and contains as its remaining principal foreign matter only particulate matter including colloidal silica or hydrous metal oxides.

6. The method of claim 5 in which the aqueous medium being treated is one which has previously been given a deionizing treatment consisting of intimately contacting the aqueous medium with a succession of filters.

7. The method of claim 5 in which the aqueous medium being treated is one which has previously been deionized by treatment with a mixture of conventional anion and cation exchange resins.

8. Composition for removing colloidal particulate matter from aqueous media containing same, consisting essentially of anion exchange resins having a macroreticular structure and further having average pore diameters which are within the range of from about 10,000 to about 500,000 Angstroms.

9. The composition of claim 8 in which the resins are in the basic form.

10. The composition of claim 8 in which the resins are in the salt form.

11. Composition for removing colloidal particulate matter from aqueous media containing same, consisting essentially of anion exchange resins having a macroreticular structure and further having average pore diameters which are within the range of from about 10,000 to about 100,000 Angstroms.

12. Means for simultaneously deionizing and removing colloidal particulate matter from an aqueous medium which consists of a mixture of an anion exchange resin whose particles have average pore diameters which are within the range of from about 10,000 to about 500,000 Angstroms and a cation exchange resin in the hydrogen form.

13. The method of removing colloidal particulate matter from an aqueous medium which comprises intimately contacting the medium with a mixture of an anion exchange resin whose particles have average pore diameters which are within the range of from about 10,000 to about 500,000 Angstroms and a cation exchange resin in the hydrogen form.

References Cited

UNITED STATES PATENTS

| | | | |
|---|---|---|---|
| 2,962,438 | 11/1960 | Smith | 210—37 |
| 3,147,214 | 9/1964 | Kressman et al. | 210—37 X |
| 3,147,215 | 9/1964 | Blight | 210—37 X |
| 3,267,073 | 8/1966 | Kun. | |
| 3,322,695 | 5/1967 | Alfrey et al. | |
| 3,367,889 | 2/1968 | Oline. | |

FOREIGN PATENTS

| | | |
|---|---|---|
| 625,753 | 8/1961 | Canada. |
| 860,695 | 2/1961 | Great Britain. |
| 932,125 | 7/1963 | Great Britain. |
| 932,126 | 7/1963 | Great Britain. |
| 932,375 | 7/1963 | Great Britain. |

OTHER REFERENCES

"Pore Structure of Some Macroreticular Resins," Kun et al., Journal of Polymer Science, Part B, June 1964, pp. 587–591 and 839.

REUBEN FRIEDMAN, *Primary Examiner.*

C. M. DITLOW, *Assistant Examiner.*

U.S. Cl. X.R.

210—38; 260—2.1